United States Patent [19]

Jorgensen et al.

[11] Patent Number: 5,757,644
[45] Date of Patent: May 26, 1998

[54] VOICE INTERACTIVE CALL CENTER TRAINING METHOD USING ACTUAL SCREENS AND SCREEN LOGIC

[75] Inventors: Jacob W. Jorgensen, Teaneck, N.J.; Alan R. Trefzger, Sterling, Va.

[73] Assignee: EIS International, Inc., Stamford, Conn.

[21] Appl. No.: 686,036

[22] Filed: Jul. 25, 1996

[51] Int. Cl.[6] .................................................. G05B 19/42
[52] U.S. Cl. ........................... 364/188; 395/2.1; 395/2.79; 395/2.85; 379/67; 379/72; 379/76
[58] Field of Search .................................. 395/2.1, 2.79, 395/2.85; 379/67, 72, 76

[56] References Cited

U.S. PATENT DOCUMENTS

| | | | |
|---|---|---|---|
| 4,776,016 | 10/1988 | Hansen | 395/2.84 |
| 4,853,952 | 8/1989 | Jachmann et al. | 379/88 |
| 4,916,726 | 4/1990 | Morley, Jr. | 379/88 |
| 5,199,062 | 3/1993 | Von Meister et al. | 379/67 |
| 5,469,491 | 11/1995 | Morley, Jr. et al. | 379/88 |
| 5,583,965 | 12/1996 | Douma et al. | 395/2.84 |

*Primary Examiner*—Reba I. Elmore
*Assistant Examiner*—McDieunel Marc
*Attorney, Agent, or Firm*—Lane, Aitken & McCann

[57] ABSTRACT

A voice interactive agent training system has a series of discrete voice messages stored in a digital memory. These messages are keyed to screens used in live call center operations. The call center logic used in live call center operations determines the sequence in which the screens are displayed on the agent's monitor. When transferred to an agent's terminal, the screen is identified, based upon a characteristic of the actual screen (e.g. character count in a field) so that there is no need for access to the call center operating system in order to identify which screen is displayed. A voice energy transducer responsive to the trainee's voice, causes a reproduction of appropriate discrete voice messages to respond to passages in the script which have been read by the trainee from the monitor. In one embodiment, agent inputs are compared to "appropriate" inputs and inappropriate inputs are fed back to the trainee concurrently with the appropriate input.

6 Claims, 7 Drawing Sheets

1

VOICE INTERACTIVE CALL CENTER TRAINING METHOD USING ACTUAL SCREENS AND SCREEN LOGIC

BACKGROUND OF THE INVENTION

1. Field of the Invention

This invention relates to a voice-interactive, computer-based system for training call center agents, and more particularly, to a system that uses actual screens in the training session.

2. Description of the Prior Art

There are a variety of multimedia, computer-based training products in the prior art, both proposed and in use. One training product that is prior art to this application under 35 U.S.C. 102(g) is disclosed in connection with FIGS. 1–4. However, this prior art system, while generally satisfactory, and while providing an advance over other prior art call center training systems does not provide an ability to incorporate into the training, existing complex screens and complex screen logic used in actual call center operation. In addition, the prior art systems do not provide immediate feedback in the event of agent error or an ability to randomize client responses.

SUMMARY OF THE INVENTION

An object of the invention is the provision of a voice interactive training system for teleservice agents which incorporates "live" screens and "live" logic.

Another object of this invention is the provision of a voice interactive training system which provides immediate feedback to the trainee.

Still another object of the invention is the provision of a training system in which the client responses are, to the trainee, apparently random.

Briefly, this invention contemplates the provision of a voice interactive system in which a series of discrete voice messages are stored in a digital memory and are keyed to screens used in live call center operation. The call center logic used in live call center operation determines the sequence in which the screens are displayed on the agent's monitor. When transferred to an agent's terminal, the screen is identified, based upon a characteristic of the actual screen (e.g. character count in a field) so that there is no need for access to the call center operating system in order to identify which screen is displayed. A voice energy transducer responsive to the trainee's voice, causes a reproduction of appropriate discrete voice messages to respond to passages in the script which have been read by the trainee from the monitor. In one embodiment, agent inputs are compared to "appropriate" inputs and inappropriate inputs are fed back to the trainee concurrently with the appropriate input.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
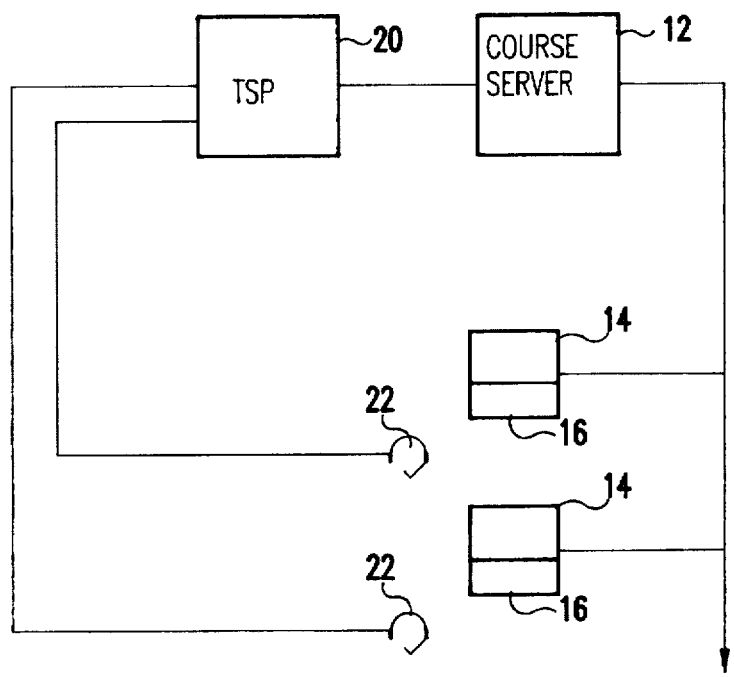
FIG. 1 is a block diagram of a stand alone hardware implementation of a voice interactive training system which is prior art under 35 U.S.C. 102(g).

Referring now to FIG. 1, it illustrates, in a block diagram format, one exemplary arrangement of hardware components for implementing the voice interactive training system of this invention. As will be appreciated by those skilled in the art, hardware components for carrying out the functions specified are commercially available, and there are a number of alternative hardware architectures known in the art which are suitable for carrying out the teaching of this invention. FIG. 1 illustrates a stand alone training system; i.e. a system dedicated for a training function.

In FIG. 1, a course server 12 includes the program material for building a training session, for storing training session programs, a digital memory for storing the text of material to be displayed on an agent monitor 14 during a training session, and digitally stored message responses, which simulate a client's responses to the agent. An agent inputs data to the course server 12 via a keyboard 16 at the agent station. A telephony server platform (TSP) 20 is coupled to a telephone set 22 at each agent station. As will be appreciated by those skilled in the art, the TSP 20 provides the required telephony switching, voice energy recognition, analog to digital A/D and digital dialog D/A conversions in response to program command inputs from the course server 12.

One of the agent terminals can be used in building a training session. The course server 12 generates graphic user interface screens for inputting the textual script and graphics which are to be displayed on the agent's monitor screen 14 during the training session and for inputting the audio responses. Each interface screen typically includes a file ID, a drop down list box, an editing function and voice commands. An answer file ID allows a user to identify an answer file in the drop down list box.

Figure 2:
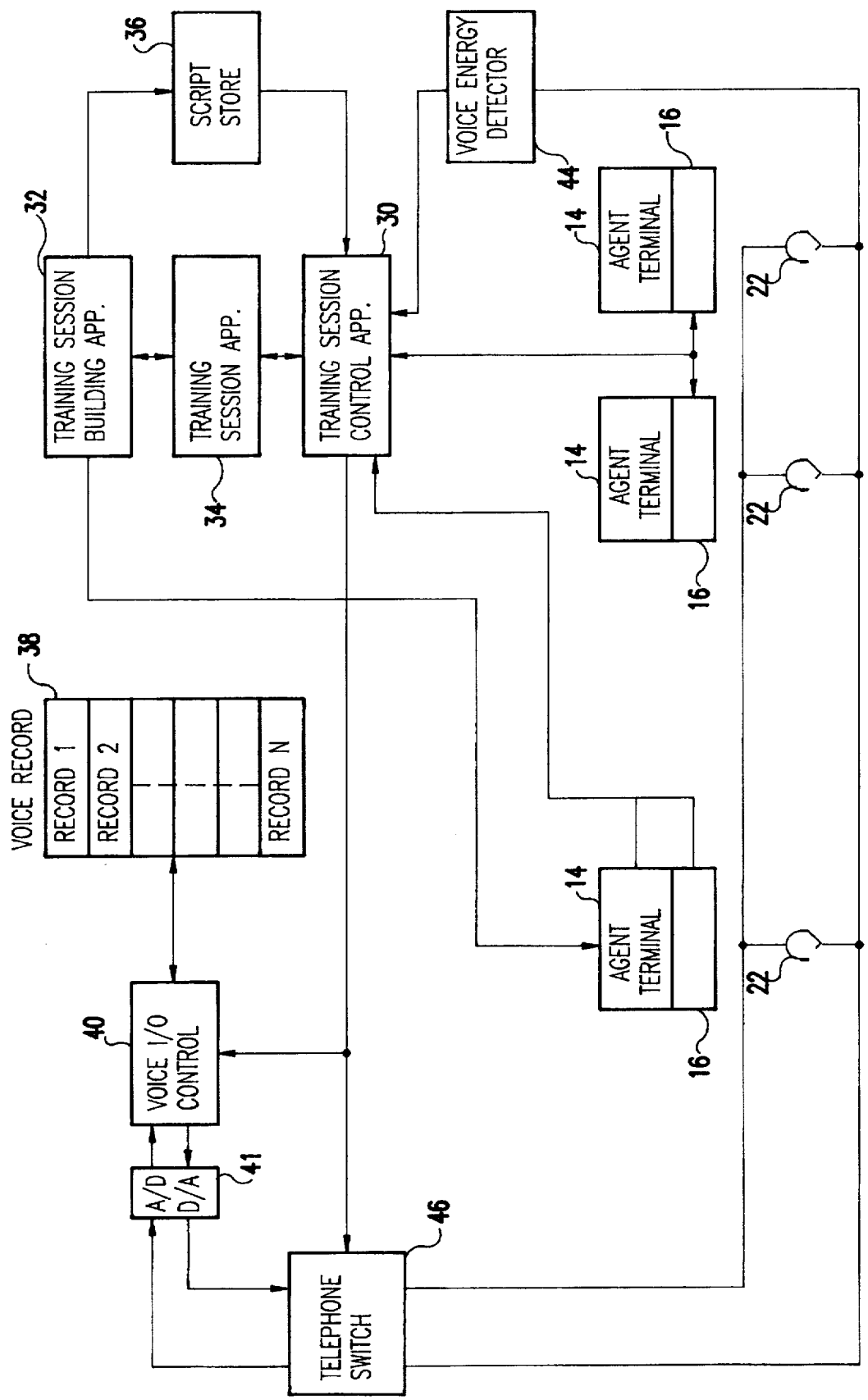
FIG. 2 is a functional block diagram of a voice interactive training system which is prior art under 35 U.S.C. 102(g).

Referring now to FIG. 2, in this training system, the course server function includes a training session control application program 30, a training session building application program 32 and the training session 34 program, which has been inputted by a user via the training session building application 32. For each training session 34 there is a text script stored in script store 36. The discrete voice messages (here indicated as record 1, record 2, etc.) are stored in a digital voice record store 38. The discrete voice message records stored in voice record store 38 are inputted and accessed by a voice record I/O control 40 which stores the voice records and accesses the voice records in response to program commands from the training session control application program 30. The discrete voice message records in voice record store 38 are indexed and identified by the training session control application 30 so that they are played back on the agent's audio headset 22 synchronously in response to pauses by the agent as he or she reads the script displayed on the monitor 14. A voice energy detector 44 generates a signal in response to a pause by the agent. Conveniently, the voice message records are indexed in a sequence by the training session building application program 32 tied to the sequence in which they are intended to be played back in response to the text material in a script displayed on the agent's monitor 14. The training session control application, in addition to controlling the storing and fetching of the voice records, provides inputs to control the telephone switch 46, and causes the appropriate script text from script store 36 to be displayed on the agent terminal monitor 14 in accordance with the particular training session program 34.

Figure 3:
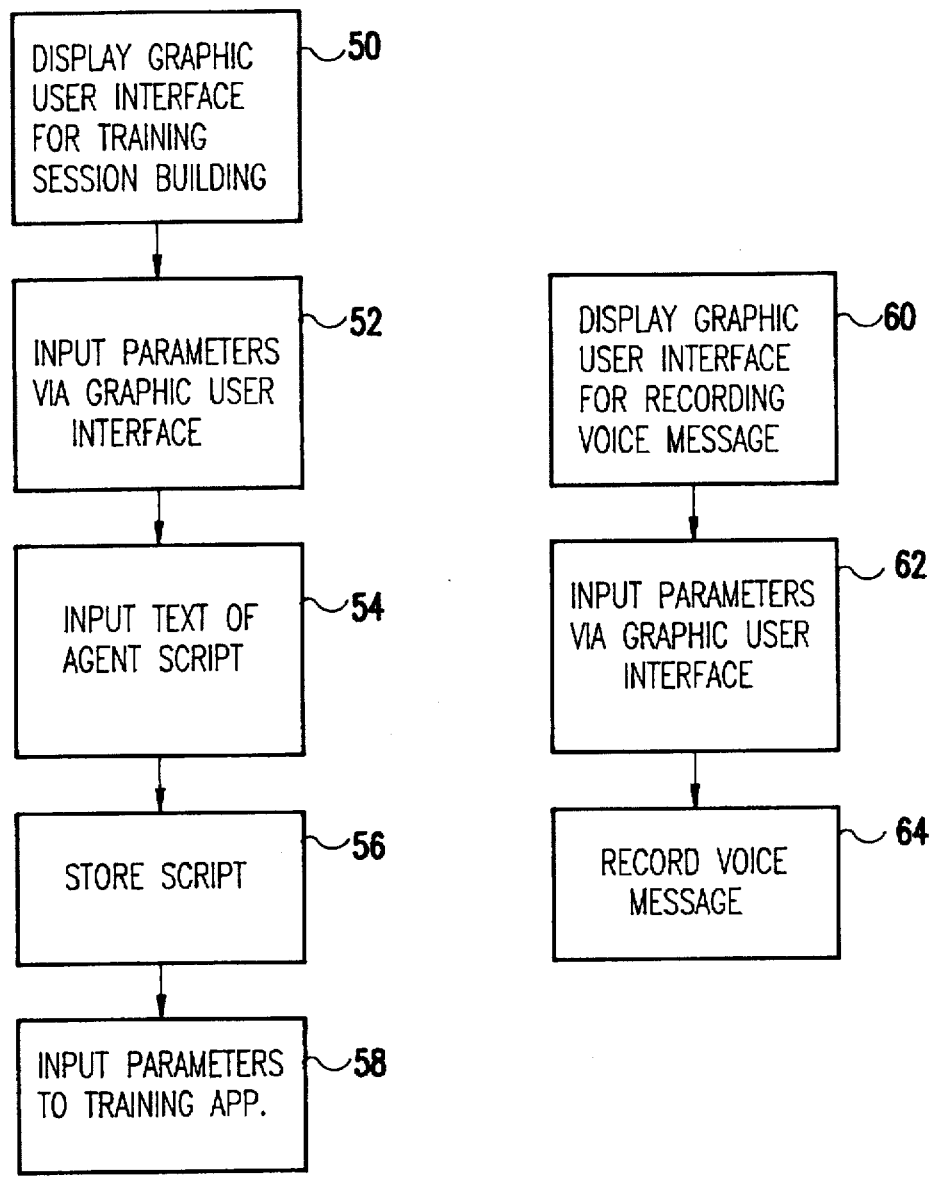
FIG. 3 is a flow chart of the steps in creating a training session which is prior art under 35 U.S.C. 102(g).

Referring now to FIG. 3 in addition to FIG. 2, in building a training session, the training session building application 32 displays an appropriate graphic user interface on the monitor 14, block 50 in FIG. 3. The training session builder inputs parameters via the graphic user interface (block 52) and inputs a text of the agent's script, block 54. The script is stored in script store 36 (block 56) and the training session control parameters for this session are inputted to the training session application 34, block 58. The training session building application 32 also provides a graphic user interface on the monitor 14 for recording voice messages as indicated at block 60. The training session builder inputs various parameters via the graphic user interface at block 62 and records the series of discrete voice messages at block 64, which are stored in voice record store 38.

Figure 4:
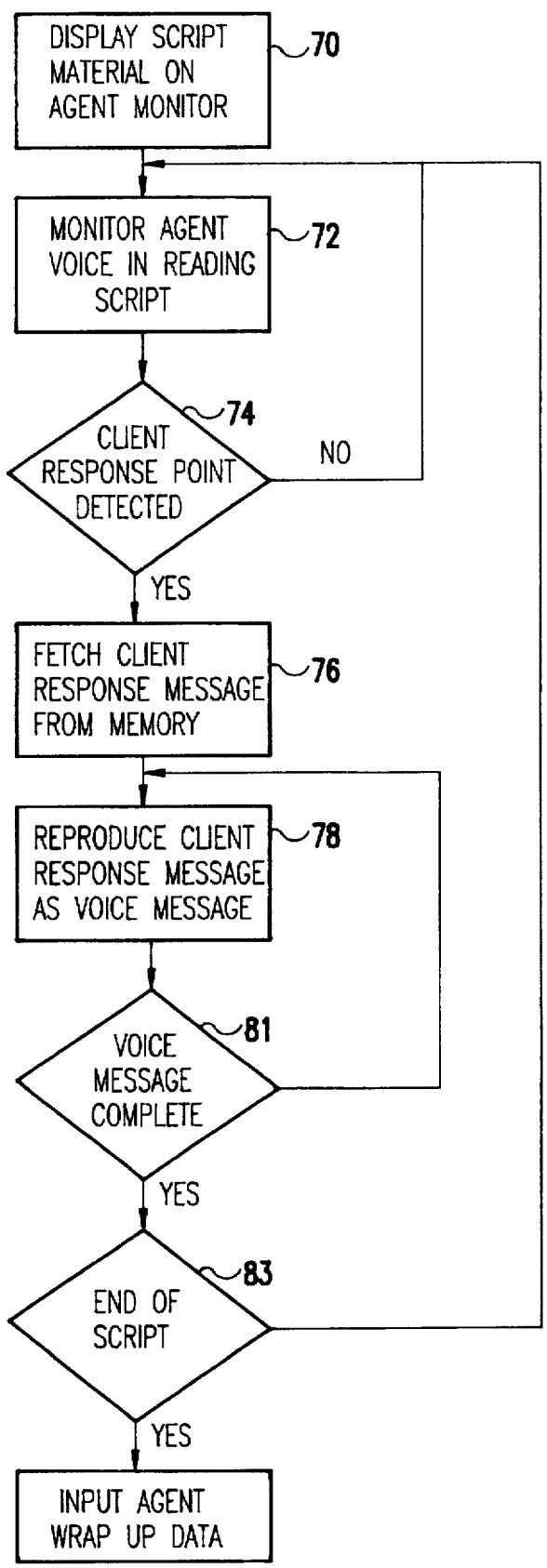
FIG. 4 is a flow chart of the steps in executing a training session which is prior art under 35 U.S.C. 102(g).

Referring now to FIG. 4, in the operation of a training session, script material from script store 36 is displayed on the monitor 14 at an agent terminal, block 70. As indicated at block 72, the agent reads the script material and, in this embodiment, the voice energy detector 44 monitors the agent's voice energy level to detect a response point for a client response, block 74. In block 76, when the response point is detected, the training session control application outputs a command to voice I/O control 40 to fetch the discrete voice message record from voice record memory 38 that provides a synchronized response to the script material. D to A converter 41 converts the digitally stored voice message to an audio voice message which is coupled via switch 46 to the appropriate headset 22 of the agent involved in the training session, block 78. When the voice message is completed, as indicated in decision block 81, the training session control application program determines at block 83 whether or not the end of the script has been reached. If it has not, the process returns to the point where the script material is displayed and the agent's voice is monitored to detect a response point for the client, and proceeds as just described. If the end point of the script is reached, the agent inputs wrap-up data.

Figure 5:
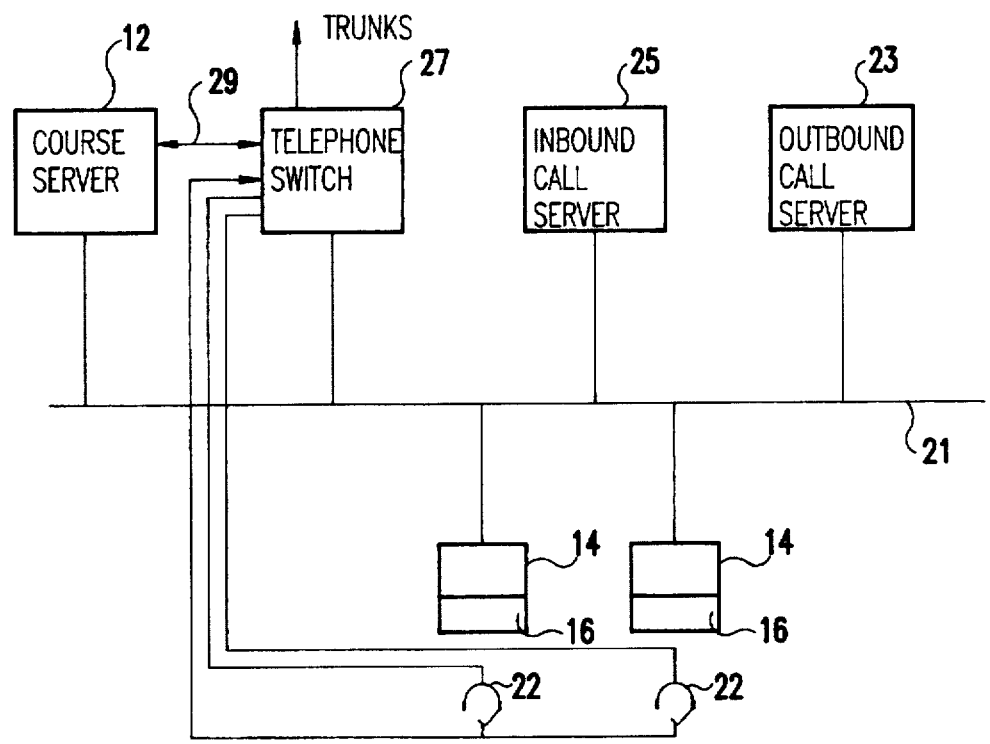
FIG. 5 is a block diagram of a voice interactive training system of this invention implemented as an add-on to a representative call center system.
Figure 6:
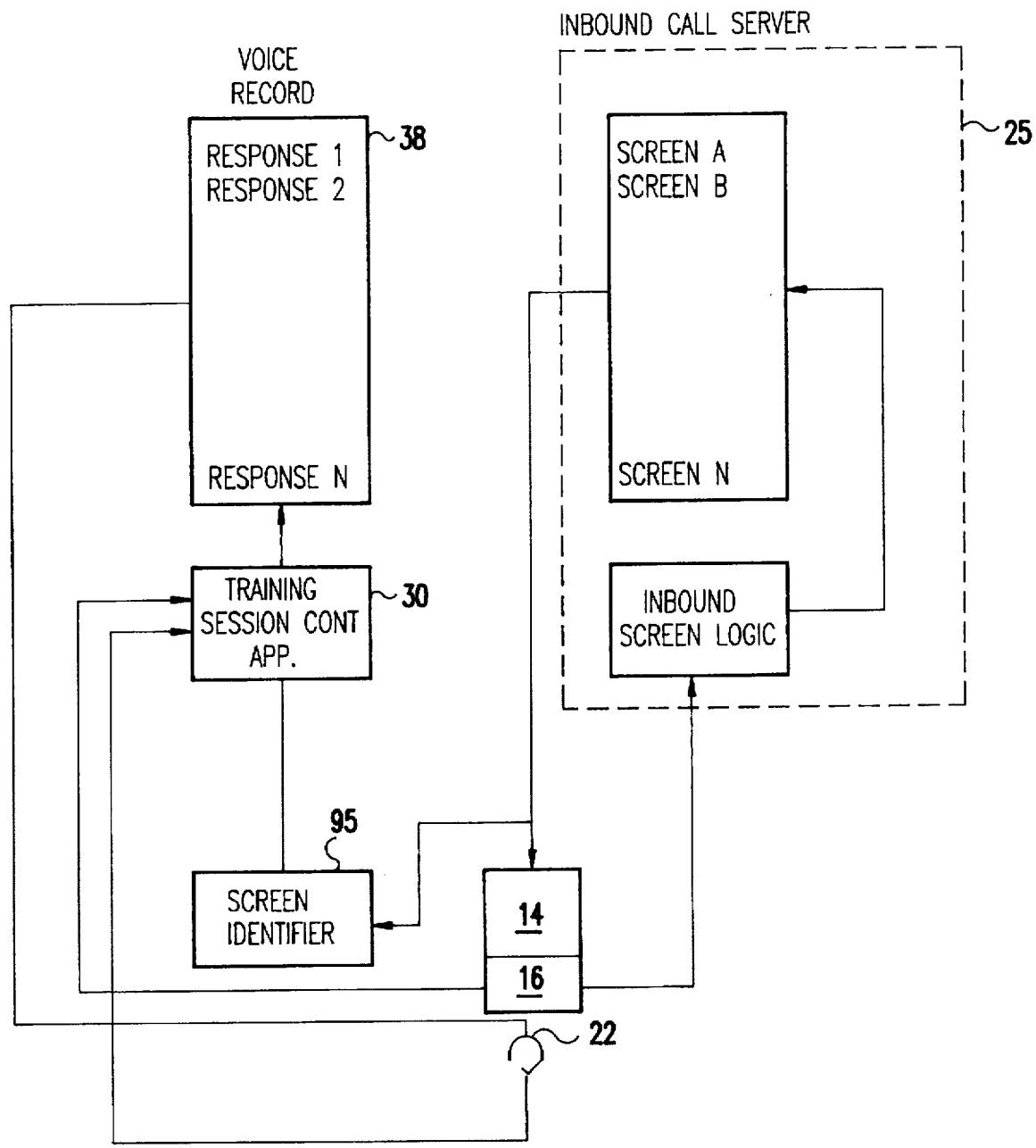
FIG. 6 is a functional block diagram of a training system in accordance with the invention, which incorporates live screens and live logic into the training session.

Referring now to FIGS. 5 and 6 in accordance with this invention, a course server 12 is integrated into a call center; in this illustrative embodiment it is integrated with a so-called client-server, call center hardware architecture. Of course, the invention can also be implemented in combination with other existing and future call center architectures. The invention could also be implemented as a stand alone system with the "live" screens and the "live" program logic downloaded from an actual call center. Here, a digital data bus 21 interconnects the call center components; e.g. an outbound server 23, an inbound server 25, telephone switch 27, agent displays 14, agent keyboards 16, and the course server 12. The course server 12 has a voice connection to the switch 27 which provides an audio connection between the course server 12 and the agent headsets 22.

As will be appreciated by those skilled in the art, in many inbound call applications and in many outbound call applications, there are a very large number of screens and a relatively complex logic which selects a screen to be displayed in response to agent inputs. Because of the number of screens and the complexity of the logic, it is impractical to realistically duplicate an inbound or outbound call center operation by building and storing special training screens. This invention, illustrated in FIGS. 5 and 6, solves this problem. Here, the actual "live" screens (as used herein, referring to text and/or graphics) and logic for an inbound call server and/or for an outbound call server are used for the training session. Significant for the implementation of the invention, is the provision of a suitable screen identifier logic (hardware and/or software) 95. Screen identifier 95 identifies a screen transferred from the "live" inbound or outbound call server to an agent terminal in response to an input from the agent terminal 16 to the "live" server, which selects a screen based on the server program logic. The screen identifier 95 can use any suitable hardware or software logic. It identifies a screen based upon some data characteristic more or less unique to each screen, such as for example, a cyclic redundancy check character for the screen data, or a count of the number of characters in a certain select field or fields of each screen. An important function of the screen identifier design 95 is that it be able to identify a "live" call server screen after it has been fetched from the call server so that it is not necessary to modify the call server data base, or input special characters to the call server data base, or even have data input access to the call server data base. The screen identifier 95 generates a live screen identifier code for each screen that is fetched from the "live" server.

Figure 7:
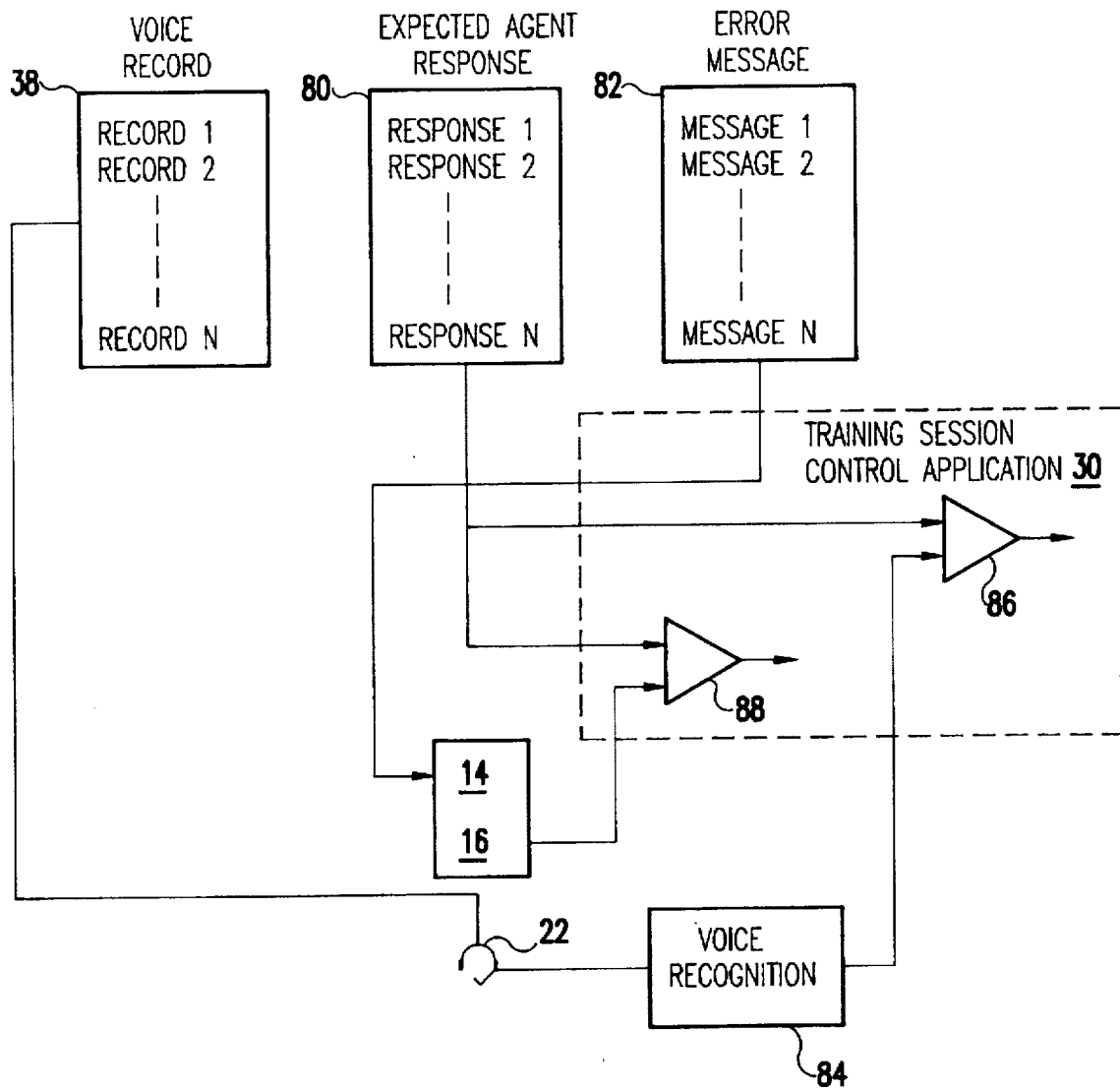
FIG. 7 is a functional block diagram of a training system with immediate feedback for agent responses that are in error.

In building a training session in accordance with this invention, an operator views the screens in the call server, for example, as they are displayed by the call server logic in response to inputs from the agent terminal. The operator assigns training identifier code (e.g. via keyboard input from the terminal) to each displayed screen. This training code identifier, assigned by the operator, and the corresponding live screen code generated by screen identifier 95, are transferred to and relationally stored, by the training application program, in the training server data base. The training code inputted by the operator is selected so that it logically points to the voice record prepared for that screen, tying the live screen code generated by screen identifier 95 to the appropriate voice record. It will be appreciated that with this procedure of tying "live" screens in the call server to voice records, identification of the screen can be made at the agent station without access to the call server program or data base. The screens are identified and tied to the stored voice record responses independently of the sequence in which they are displayed, which sequence is determined by the call server logic in response to the trainee inputs. The stored voice responses to the trainee agent are generated as described in the prior art system explained in connection with FIGS. 1–4. Referring now to FIG. 7, in order to provide immediate feedback to an agent during a training session, in this embodiment of the invention an expected agent response file 80 is generated in building the training session. The expected agent response file 80 contains expected agent voice responses to the client responses stored in voice record file 38 and/or expected agent responses to agent inputs via the keyboard 16 to the client responses stored in voice record file 38. These expected agent responses in file 80 are keyed to the voice record responses in file 38; i.e. record 1 is keyed to response 1, etc. In addition, an error message file 82 is generated, which is similarly keyed to the responses in the expected agent response file 80. An output of the error message file 82 is coupled to the agent display 14.

The voice output from the agent headset 22 is coupled to a suitable commercially available voice recognition module 84, which may be either speaker dependent or speaker independent. The output of the voice recognition unit is coupled as one input to a comparator 86 which may be software or hardware implemented. Similarly, an output of the keyboard 16 is coupled as one input to a comparator 88. The expected agent response file 80 provides the other inputs to comparators 86 and 88. The training session control application couples the outputs of comparators 86 and 88 to the error message file 82.

In operation the training center application 30 couples to the comparators 86 and 88 the expected agent response from file 80 corresponding to a voice record from file 38 which has been coupled to the audio input of the agent headset 22. If the agent's response as detected by the voice recognition module 84 and/or the agent's response inputted by keyboard 16 corresponds to the expected agent response, the training session control application proceeds with the program training session. If the agent's audio and/or keyboard response does not correspond to the expected agent response the training center application displays an appropriate error message from the error message file 82 prior to proceeding with the training session.

Figure 8:
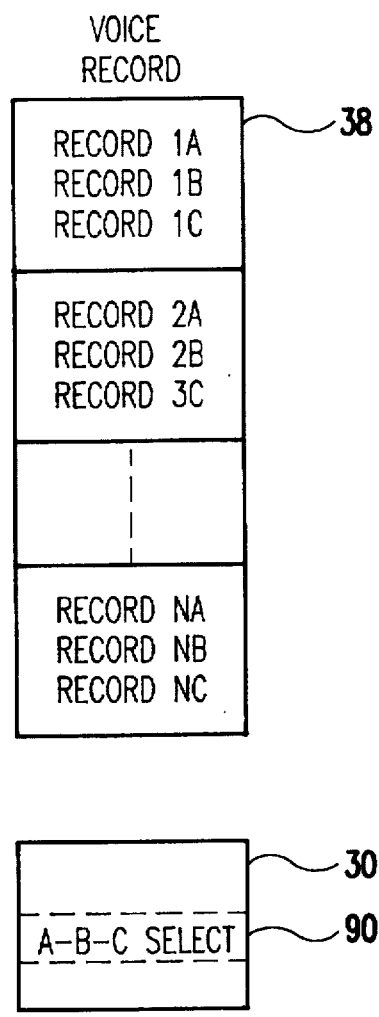
FIG. 8 is a functional block diagram of a training system in which the client response is selected from a plurality of responses.

Referring now to FIG. 8, in this embodiment of the invention alternate forms of a client response are digitally recorded and stored for some or all of the voice records. This allows the same training session to be used with an agent more than once without the agent anticipating the client's response. In the figure, the alternate responses are labeled A, B and C. The training session application in this embodiment of the invention has a suitable program 90 for selecting one of the alternate responses that to an agent trainee is at least apparently random.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A voice interactive method for training agents to act in a telephone call center in response to voice inputs from a client, including the steps of:

storing digitally a plurality of addressable sets of voice messages that simulate client responses to an agent who is reading from a script displayed on a screen and who is making inputs at an agent terminal in response to said simulated client response;

selecting and displaying an actual script from a call center data base, said script selected by call center logic in response to agent inputs at the agent terminal during a training session;

generating an address of a set of said voice messages in response to said actual script selected in said selecting displaying step;

fetching said set of said voice messages at said address; and creating from set of said voice messages fetched in said fetching step, voice inputs to said agent reading from the script on said displayed screen.

2. The voice interactive method for training agents as in claim 1 wherein said generating step includes decoding a characteristic of the content of said screen.

3. The voice interactive method for training agents as in claim 2 wherein said characteristic is independent of the method for training.

4. A voice interactive method for training agents to act in a telephone call center in response to voice inputs from a client, including the steps of:

storing digitally a plurality of voice messages that simulate client responses to an agent who is reading from a script displayed on a screen;

storing digitally a preferred agent response to each of said voice messages;

comparing an agent response to said each of said voice messages to said preferred agent response;

displaying an error message when said comparing step indicates a divergence between said agent response and said preferred agent response.

5. A voice interactive method for training agents to act in a telephone call center in response to voice inputs from a client, including the steps of;

storing digitally a plurality of sets of voice messages that simulate client responses to an agent who is reading from a script displayed on a screen;

each of said sets comprised of two or more alternative responses to a single input from an agent who is following a displyed screen;

selecting one of said two or more alternative responses;

fetching said one of said two or more alternative responses selected in said selecting step; and creating, from said voice message fetched in said fetching step, a voice input to said agent following said displayed screen.

6. The voice interactive method for training agents as in claim 5 wherein said selecting step is carried out so as to appear random to said agent.

* * * * *